(12) United States Patent
Cho et al.

(10) Patent No.: US 7,277,042 B1
(45) Date of Patent: Oct. 2, 2007

(54) COMPENSATION OF FLIGHT PATH DEVIATION FOR SPOTLIGHT SAR

(75) Inventors: Kwang M. Cho, Los Angeles, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 135 days.

(21) Appl. No.: 11/433,707

(22) Filed: May 12, 2006

(51) Int. Cl.
*G01S 13/90* (2006.01)
*G01S 13/00* (2006.01)

(52) U.S. Cl. .............. 342/25 F; 342/25 R; 342/25 A; 342/25 D; 342/165; 342/173; 342/174; 342/175; 342/195; 342/196

(58) Field of Classification Search .... 342/25 R–25 F, 342/82–103, 175, 176, 179, 190–197, 165–174
See application file for complete search history.

(56) References Cited

U.S. PATENT DOCUMENTS

| | | | | |
|---|---|---|---|---|
| 4,034,370 A | * | 7/1977 | Mims | 342/25 D |
| 4,084,158 A | * | 4/1978 | Slawsby | 342/25 F |
| 4,617,567 A | * | 10/1986 | Chan | 342/25 A |
| 4,786,906 A | * | 11/1988 | Krogager | 342/25 F |
| 5,243,351 A | * | 9/1993 | Rafanelli et al. | 342/25 D |
| 5,327,140 A | * | 7/1994 | Buckreuss | 342/25 A |
| 5,448,241 A | * | 9/1995 | Zeoli et al. | 342/25 A |
| 5,659,318 A | * | 8/1997 | Madsen et al. | 342/25 C |
| 5,677,693 A | * | 10/1997 | Frankot et al. | 342/25 C |
| 6,037,893 A | * | 3/2000 | Lipman | 342/25 F |
| 6,208,283 B1 | * | 3/2001 | Murata et al. | 342/25 R |
| 6,781,541 B1 | * | 8/2004 | Cho | 342/25 D |

(Continued)

FOREIGN PATENT DOCUMENTS

EP        0716318 A1 * 6/1996

Primary Examiner—Bernarr E. Gregory
(74) Attorney, Agent, or Firm—Leonard A. Alkov (57) ABSTRACT

A radar acquires a formed SAR image of radar scatterers in an area around a central reference point (CRP). Target(s) are within the area illuminated by the radar. The area covers terrain having a plurality of elevations. The radar is on a moving platform, where the moving platform is moving along an actual path. The actual path is displaced from an ideal SAR image acquisition path. The radar has a computer that divides the digital returns descriptive of the formed SAR image into multiple blocks, such as a first strip and an adjacent strip. The first strip is conveniently chosen, likely to generally align with a part of the area, at a first elevation. An adjacent strip covers a second part of the area at a second elevation. The first strip is overlapping the adjacent strip over an overlap portion. The first and second elevation are extracted from a terrain elevation database (DTED). Horizontal displacement of returns (range deviation) is computed for each strip using the elevation information from the terrain elevation database. Taylor series coefficients are computed for the horizontal displacement due to terrain elevation using the ideal path, the actual path and central reference point. Actual flight path deviation is available at each pulse position while azimuth frequency is given in azimuth angle off mid angle point. Remapping between indices in two arrays is also computed. Phase error compensation and compensation in azimuth (spacial frequency) is computed using the Taylor series coefficients, a Fast Fourier Transform and an inverse Fast Fourier Transform for each strip. Phase error compensation is applied to the digital returns from each strip to obtain the SAR image. The SAR image is further improved by having the first strip corrected data and the second strip corrected data merged over the overlap portion to generate a relatively seamless SAR image.

12 Claims, 7 Drawing Sheets

U.S. PATENT DOCUMENTS 6,853,330 B1 * 2/2005 Krikorian et al. ........... 342/175
6,987,479 B1 * 1/2006 Hansen et al. ............ 342/25 F
7,038,612 B2 * 5/2006 Chow et al. .............. 342/25 F
7,095,358 B2 * 8/2006 Krikorian et al. ......... 342/25 B
2006/0028370 A1 * 2/2006 Hansen et al. ............ 342/25 A

* cited by examiner

COMPENSATION OF FLIGHT PATH DEVIATION FOR SPOTLIGHT SAR

This invention was made with Government support under Contract No. F19628-00-C-0100 awarded by the Department of the Air Force. The Government has certain rights in this invention.

BACKGROUND OF THE INVENTION

1. Field of Invention

This invention is in the field of Synthetic Aperture Radar (SAR) where the platform acquiring the image deviates from an ideal flight path and the terrain being illuminated has variations in elevation above sea level.

2. Description of the Related Art

Synthetic Aperture Radar (SAR) is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is coherently combined to arrive at a high resolution SAR image.

The plurality of returns creating a SAR image generated by the transmitted pulses are assumed to be acquired along a presumed known, planar and rectilinear path of the platform to make up an array. If following the proper path, during the array, amplitude as well as phase information returned from each of the pulses, for each of many range bins, is preserved. That is, the SAR image is formed from the coherent combination of the amplitude and phase of return(s) within each range bin, motion compensated for spatial displacement of the moving platform during the acquisition of the returns for the duration of the array.

The clarity of details of a SAR image is dependent, among other factors, on the accuracy of the motion compensation applied to each radar return prior to SAR image computation as well as relative position of the platform with respect to the ideal path required for SAR image acquisition. Motion compensation shifts the phase of each radar sample (typically an I+jQ complex quantity derived from an analog to digital converter) in accordance with the motion in space of the moving platform with respect to the range to a reference point. The SAR imaging process depends on the coherent, phase accurate summing of the sequence of ALL radar returns expected within an array. These principles are detailed by W. G. Carrara, R. S. Goodman and R. M. Majewski in *Spotlight Synthetic Radar*, Boston, Artech House, 1995.

However, coherent summing depends on an accurate description of SAR platform (aircraft) path. Where a non-ideal platform motion exists, having flight path deviations (FPD) away from a rectilinear, planar path, motion compensation of the pulses may not totally account for phase errors. Consequently, the coherent summing of radar returns over an array will also be inaccurate. The resulting phase error over the array blurs the SAR image, reducing its utility.

Another limitation of the motion compensation mechanism is the inherent assumption that the area being illuminated is at a constant ground elevation, relatively flat. Where that is not the case, returns will arrive at a range different from the one assumed, thus introducing phase inaccuracies. Thus, variations in elevation bring a resulting SAR image that is again blurred, reducing its utility.

SUMMARY OF THE INVENTION

Above limitations are avoided by a radar acquiring a formed SAR image of radar scatterers in an area around a central reference point (CRP). Target(s) are within the area illuminated by the radar. The area covers terrain having a plurality of elevations. The radar is on a moving platform, where the moving platform is moving along an actual path. The actual path is displaced from an ideal path. For best SAR imagery, the ideal path is meant to be rectilinear in a reference plane formed by the ideal flight path and the CRP. However, the actual path may diverge from the ideal path by rising or dipping below the reference plane and not maintaining rectilinear direction. These conditions are compensated for a clearer SAR image by the radar comprising an analog to digital converter for converting radar returns from the illuminated area to digital returns, a navigation system for motion compensating the digital returns with respect to the central reference point, actual path of the platform and a computer.

The computer divides the digital returns descriptive of the formed SAR image into multiple blocks, such as a first strip and an adjacent strip. Each first strip is conveniently chosen, likely to generally align with a part of the area, at a first elevation. An adjacent strip covers a second part of the area at a second elevation. The first strip is overlapping the adjacent strip over an overlap portion. The elevation of the first strip and second strip are extracted from a terrain elevation database (DTED). Horizontal displacement of returns (range deviation) is computed for each strip using the elevation information from the terrain elevation database.

Taylor series coefficients are computed for the first horizontal displacement and the second horizontal displacement using the ideal path, the actual path and central reference point for the first strip, the adjacent strip and all remaining strips making up the area. Actual flight path deviation is available at each pulse position while azimuth frequency is given in azimuth angle off mid angle point. Remapping between indices in two arrays is also computed.

Phase error compensation and compensation in azimuth (spacial frequency) is computed using the Taylor series coefficients, a Fast Fourier Transform and an inverse Fast Fourier Transform for the first strip to obtain first strip corrected data and for the adjacent strip to obtain second strip corrected data. The phase error compensation is applied to the digital returns to obtain the SAR image. The SAR image is further improved by having the first strip corrected data and the second strip corrected data merged over the overlap portion to generate a relatively seamless SAR image.

DETAILED DESCRIPTION OF THE INVENTION

In the present disclosure, a SAR image is formed from a sequence of pulses transmitted and reflected from static objects within an area of interest. Received data in a pulse interval is comprised of range samples. The range samples have a fast rate. Conversely, the pulse repetition rate has a slow rate. Both the fast rate and the slow rate are used as inputs for image formation processing.

Figure 1:
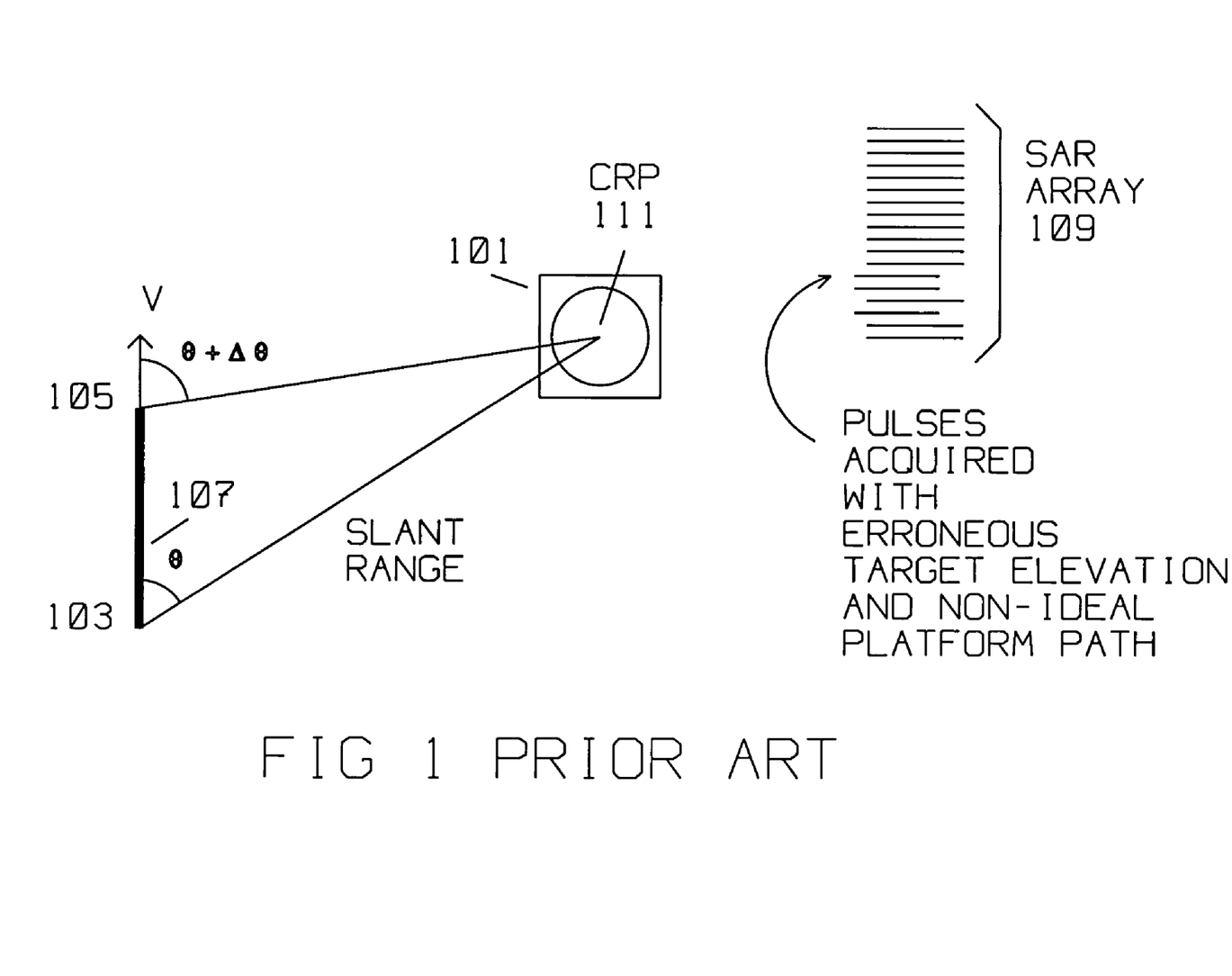
FIG. 1 shows the prior art where radar returns are acquired with erroneous platform position.

FIG. 1 shows the typical prior art geometric relationship between a moving platform carrying a radar transmitter/receiver using Synthetic Aperture (SAR) spot search methods imaging patch 101 by said radar transmitter/receiver. The moving platform is initially at position 103, travels along a rectilinear path 107 with velocity V to position 105. In SAR spot mode applicable in this description, the SAR antenna azimuth is variable at azimuth angle θ to θ+Δθ oriented towards patch 101 as the platform moves with velocity V. The moving platform moves from position 103 to position 105 along path 107, so that the antenna illuminates patch 101 with respect to a motion compensation reference point, the Central Reference Point (CRP) 111, as it progresses. Radar pulses are transmitted and corresponding returns received at many points during the array 109 collected between position 103 and position 105. Typically, a complete array has $2^n$ pulses such as 256, 512, 1024, 2048, for compatibility with a subsequent FFT. A typical SAR array 109 has one or more pulses whose phase correction for forming the SAR image is based on erroneous platform position.

If the actual flight path of the moving platform deviates from the ideal, assumed straight line path, between position 103 and position 105, image quality for targets located some distance from the (image) CRP degrades. Image degradation due to flight path deviation (FPD), also referred to as non-planar motion (NPR), is a common phenomenon with typical SAR formation algorithms. One approach to minimize image degradation is through range re-sampling based on the cosine of grazing angles at the CRP computed from the difference between the ideal and actual flight path. This, however, does not fully compensate for the FPD effect for targets located away from the CRP horizontally or vertically. To reduce the effects of this limitation, in this disclosure, SAR image quality is improved by using more accurate area elevation obtained from various map elevation contour databases, identified as Digital Terrain Elevation Data (DTED), in conjunction with flight deviation (from the ideal flight path) measurements.

The present teaching describes the derivation for the required phase correction and processing steps for producing a clearer SAR image by compensating for FPD effects. The phase correction is derived based on target displacement using Taylor Series expansion. Associated signal processing method steps are also detailed.

1. Phase Correction Based on Target Displacement Using Taylor Series Expansion

Figure 2:
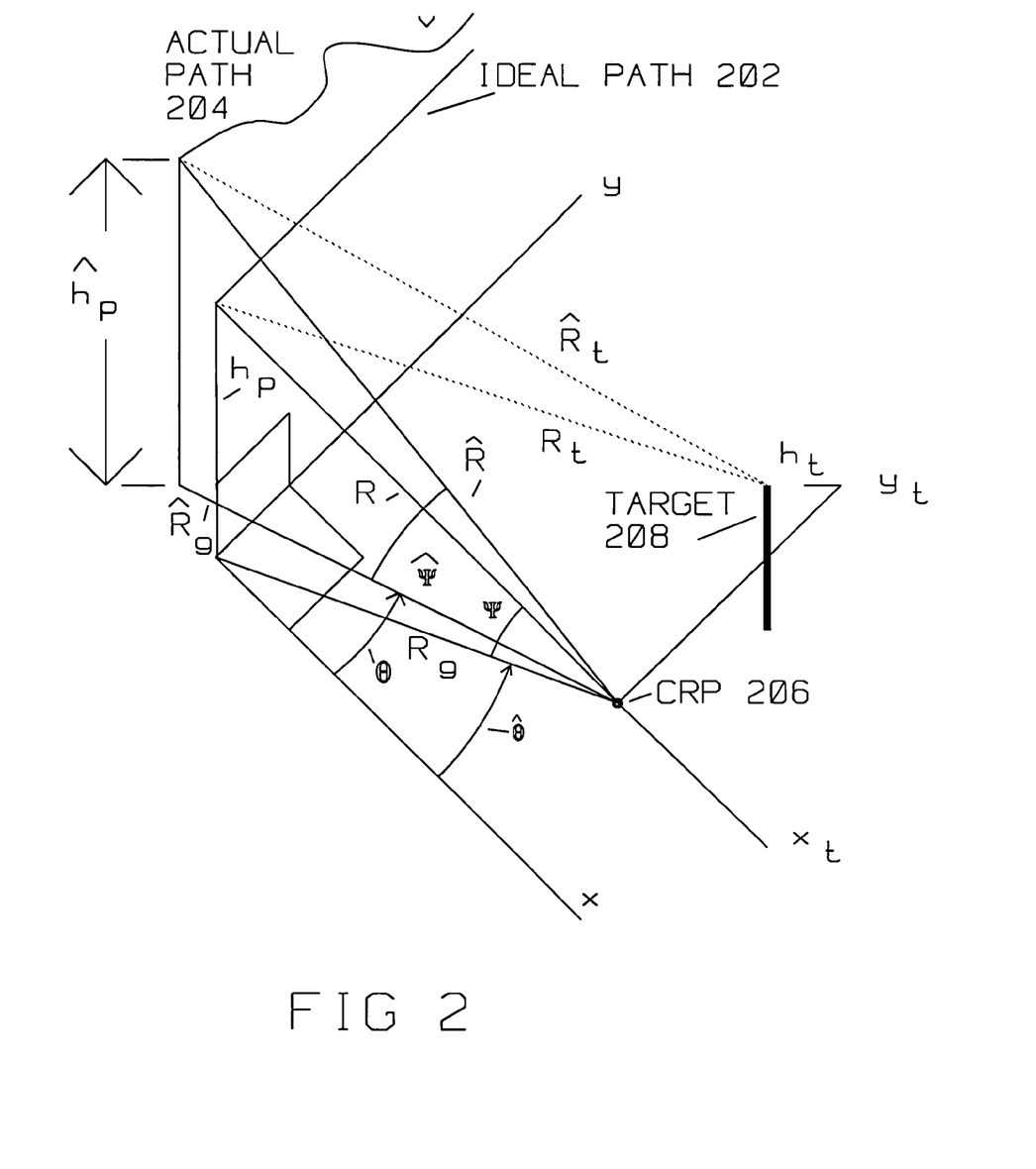
FIG. 2 shows the geometry of the analytical aspect of this disclosure with respect to the target and platform path.

As shown in FIG. 2, the ideal, theoretical path expected of a radar platform for a SAR image acquisition is a straight line parallel to the x, y plane, such as Ideal Path 202. However, a typical Actual Path 204 will have a variable non-rectilinear path above the x, y plane, as well as non-uniform altitude $h_p$ above the x, y plane. Denoting the ranges from the antenna phase center to the CRP 206 and to a target 208 with R and $R_t$ respectively, phase of the target signal after range compression is expressed as:

$$\Phi = -2\pi K_R (R_t - R) \quad (1)$$

Here, $K_R$ is the variable in spatial frequency domain with the expression $$K_R = \frac{2}{C}\left[f_c + \gamma\left(\hat{t} - \frac{2R}{C}\right)\right]$$

where C, $f_c$, γ, $\hat{t}$ are, respectively, speed of light, radar center frequency, chirp rate and fast time variable (range increments, range bins).

Since the fast time samples are taken around the return time from the Central Reference Point (CRP), $K_R$ is the spatial frequency samples around $$\frac{2f_c}{c} = \frac{2}{\lambda}$$

Therefore, the approximate phase expression is:

$$\Phi = \frac{4\pi}{\lambda}(R_t - R). \quad (2)$$

Using the range, elevation, and angle variables as indicated in FIG. 2, range expression from the radar on ideal flight path to a target is $$R_t = \sqrt{(R_g\cos\theta + x_t)^2 + (R_g\sin\theta + y_t)^2 + (h_p - h_t)^2}$$
$$= \sqrt{R^2 + 2R_g(\cos\theta \cdot x_t + \sin\theta \cdot y_t) + (x_t^2 + y_t^2) - 2h_p h_t + h_t^2}$$

This can be expanded in Taylor series as follows for the target dependent variables, $x_t$, $y_t$, $h_t$ around CRP 206, the central reference point, where $x_t=0$, $y_t=0$, $h_t=0$, as shown in FIG. 2.

$$R_t = R_t\Big|_{CRP} + \frac{\partial R_t}{\partial x_t}\Big|_{CRP} x_t + \frac{\partial R_t}{\partial y_t}\Big|_{CRP} y_t + \frac{\partial R_t}{\partial h_t}\Big|_{CRP} h_t +$$
$$\frac{1}{2} \cdot \frac{\partial^2 R_t}{\partial x_t^2}\Big|_{CRP} x_t^2 + \frac{1}{2} \cdot \frac{\partial^2 R_t}{\partial y_t^2}\Big|_{CRP} y_t^2 + \frac{1}{2} \cdot \frac{\partial^2 R_t}{\partial h_t^2}\Big|_{CRP} h_t^2 +$$
$$\frac{\partial}{\partial y_t}\frac{\partial R_t}{\partial x_t}\Big|_{CRP} x_t y_t + \frac{\partial}{\partial h_t}\frac{\partial R_t}{\partial x_t}\Big|_{CRP} x_t h_t + \frac{\partial}{\partial h_t}\frac{\partial R_t}{\partial y_t}\Big|_{CRP} + \ldots \, .$$

Coefficients of the series truncated at second order are obtained as follows.

$$a_{000} = R_t\big|_{CRP} = R$$

$$a_{100} = \frac{\partial R_t}{\partial x_t}\Big|_{CRP} = \frac{R_g\cos\theta + x_t}{R_t}\Big|_{CRP} = \cos\psi\cos\theta$$

$$a_{010} = \frac{\partial R_t}{\partial y_t}\Big|_{CRP} = \frac{R_g\sin\theta + y_t}{R_t}\Big|_{CRP} = \cos\psi\sin\theta$$

-continued $$a_{001} = \frac{\partial R_t}{\partial h_t}\bigg|_{CRP} = \frac{-h_p + h_t}{R_t}\bigg|_{CRP} = \sin\psi$$

$$a_{200} = \frac{1}{2}\frac{\partial^2 R_t}{\partial x_t^2}\bigg|_{CRP} = \frac{1}{2}\frac{\partial^2 R_t}{\partial x_t}\left(\frac{R_g\cos\theta + x_t}{R_t}\right)\bigg|_{CRP}$$

$$= \frac{R_t - \left(\frac{R_g\cos\theta + x_t}{R_t}\right)(R_g\cos\theta + x_t)}{R_t^2}\bigg|_{CRP}$$

$$= \frac{R^2 - R_g^2\cos^2\theta}{2R^3} = \frac{1 - \cos^2\psi\cos^2\theta}{2R}$$

$$a_{020} = \frac{1}{2}\frac{\partial^2 R_t}{\partial y_t^2}\bigg|_{CRP} = \frac{1 - \cos^2\psi\sin^2\theta}{2R}$$

$$a_{002} = \frac{1}{2}\frac{\partial^2 R_t}{\partial h_t^2}\bigg|_{CRP} = \frac{1}{2}\frac{\partial^2 R_t}{\partial h_t}\left(\frac{-h_p + h_t}{R_t}\right)\bigg|_{CRP}$$

$$= \frac{R_t\left(\frac{-h_p + h_t}{R_t}\right)(-h_p + h_t)}{2R_t^2}\bigg|_{CRP} = \frac{R^2 - h_p^2}{2R^3} = \frac{\cos^2\psi}{2R}$$

$$a_{110} = \frac{\partial}{\partial y_t}\frac{\partial R_t}{\partial x_t}\bigg|_{CRP} = \frac{\partial}{\partial y_t}\left(\frac{R_g\cos\theta + x_t}{R_t}\right)\bigg|_{CRP}$$

$$= \frac{-\left(\frac{R_g\sin\theta + y_t}{R_t}\right)(R_g\cos\theta + x_t)}{R_t^2}\bigg|_{CRP}$$

$$= \frac{-R_g^2\cos\theta\sin\theta}{R^3} = \frac{-\cos^2\psi\cos\theta\sin\theta}{R}$$

$$a_{101} = \frac{\partial}{\partial h_t}\frac{\partial R_t}{\partial x_t}\bigg|_{CRP} = \frac{\partial}{\partial h_t}\left(\frac{R_g\cos\theta + x_t}{R_t}\right)\bigg|_{CRP}$$

$$= \frac{-\left(\frac{-h_p + h_t}{R_t}\right)(R_g\cos\theta + x_t)}{R_t^2}\bigg|_{CRP}$$

$$= \frac{h_p R_g\cos\theta}{R^3} = \frac{-\cos^2\psi\sin\theta\cos\theta}{R}$$

$$a_{011} = \frac{\partial}{\partial h_t}\frac{\partial R_t}{\partial y_t}\bigg|_{CRP} = \frac{\partial}{\partial h_t}\left(\frac{R_g\sin\theta + y_t}{R_t}\right)\bigg|_{CRP}$$

$$= \frac{-\left(\frac{-h_p + h_t}{R_t}\right)(R_g\sin\theta + y_t)}{R_t^2}\bigg|_{CRP}$$

$$= \frac{h_p R_g\sin\theta}{R^3} = \frac{-\cos^2\psi\sin\theta\sin\theta}{R}$$

where $\cos\psi = \frac{\sqrt{R^2 - h_p^2}}{R}$.

Phase expression for the case of actual flight path can be obtained in the same manner. The points on the desired flight path are selected to keep the ground azimuth cone angle the same between the actual pulse position and the corresponding point on the desired flight path. Adding the symbol "hat" over the corresponding variables, (e.g. $\hat{R}_t$) generates range expression from the radar on actual flight path to a target as:

$$\hat{R}_t = \sqrt{\hat{R}^2 + 2\hat{R}_g(\cos\hat{\theta}\cdot x_t + \sin\hat{\theta}\cdot y_t) + (x_t^2 + y_t^2) - 2\hat{h}_p h_t + h_t^2}$$

Coefficients of the truncated Taylor series is $$\hat{a}_{000} = \hat{R}_t|_{CRP} = \hat{R}$$

-continued $$\hat{a}_{100} = \frac{\partial R_t}{\partial x_t}\bigg|_{CRP} = \cos\hat{\psi}\cos\hat{\theta}$$

$$\hat{a}_{010} = \frac{\partial R_t}{\partial y_t}\bigg|_{CRP} = \cos\hat{\psi}\sin\hat{\theta}$$

$$\hat{a}_{001} = \frac{\partial R_t}{\partial h_t}\bigg|_{CRP} = -\sin\hat{\psi}$$

$$\hat{a}_{200} = \frac{\partial^2 R_t}{\partial x_t^2}\bigg|_{CRP} = \frac{1 - \cos^2\hat{\psi}\cos^2\hat{\theta}}{2\hat{R}}$$

$$\hat{a}_{020} = \frac{\partial^2 R_t}{\partial y_t^2}\bigg|_{CRP} = \frac{1 - \cos^2\hat{\psi}\sin^2\hat{\theta}}{2\hat{R}}$$

$$\hat{a}_{002} = \frac{\partial^2 R_t}{\partial h_t^2}\bigg|_{CRP} = \frac{\cos^2\hat{\psi}}{2\hat{R}}$$

$$\hat{a}_{110} = \frac{\partial}{\partial y_t}\frac{\partial R_t}{\partial x_t}\bigg|_{CRP} = \frac{-\cos^2\hat{\psi}\cos\hat{\theta}\sin\hat{\theta}}{\hat{R}}$$

$$\hat{a}_{101} = \frac{\partial}{\partial h_t}\frac{\partial R_t}{\partial x_t}\bigg|_{CRP} = \frac{\cos^2\hat{\psi}\sin\hat{\psi}\cos\hat{\theta}}{\hat{R}}$$

$$\hat{a}_{111} = \frac{\partial}{\partial h_t}\frac{\partial R_t}{\partial y_t}\bigg|_{CRP} = \frac{\cos^2\hat{\psi}\sin\hat{\psi}\sin\hat{\theta}}{\hat{R}}$$

The range variable in equation 1 is different for the ideal path 202 and actual path 204. The range variable can be partially compensated to adjust for actual flight path 204 deviation from ideal path 202 by resampling $K_R$. A Range Interpolator is usually employed in the pulse to pulse processing stage of SAR processing to achieve the resampling function. For the complete target dependent flight path correction the formed image is used. Conceptually, as applied to this disclosure, Range interpolation processing corresponds to compensation of linear Taylor series terms with zero target elevation. Phase change through the range interpolator is detailed by separating the two linear phase terms and the remaining phase terms.

$$\Phi = -2\pi K_R(R_t - R)$$
$$= -2\pi K_R[\Delta R_1 + \Delta R_e]$$
$$\hat{\Phi} = -2\pi \hat{K}_R(\hat{R}_t - \hat{R})$$
$$= -2\pi \hat{K}_R[\Delta \hat{R}_1 + \Delta \hat{R}_e]$$

where $\Delta R_1 = a_{100}x_t + a_{010}y_t$ $\Delta R_e = a_{001}h_t + a_{200}x_t^2 + a_{020}y_t^2 + a_{002}h_t^2 + a_{110}x_t y_t + a_{101}x_t h_t + a_{011}y_t h_t$ $\Delta \hat{R}_1 = \hat{a}_{100}x_t + \hat{a}_{010}y_t$ $\Delta \hat{R}_e = \hat{a}_{001}h_t + \hat{a}_{200}x_t^2 + \hat{a}_{020}y_t^2 + \hat{a}_{002}h_t^2 + \hat{a}_{110}x_t y_t + \hat{a}_{101}x_t h_t + \hat{a}_{011}y_t h_t$ Phase with linear terms are $$\Phi_1 = -2\pi K_R \Delta R_1$$
$$= -2\pi K_R\cos\psi(\cos\theta\cdot x_t + \sin\theta\cdot y_t)$$
$$= -2\pi K_R r_t\cos\psi$$

-continued $$\hat{\Phi}_1 = -2\pi \hat{K}_R \Delta \hat{R}_1$$
$$= -2\pi \hat{K}_R \cos\hat{\psi}(\cos\hat{\theta} \cdot x_t + \sin\hat{\theta} \cdot y_t)$$
$$= -2\pi \hat{K}_R \hat{r}_t \cos\hat{\psi}$$

Setting the points on ideal path so that $\hat{\theta}$ equals $\theta$ and neglecting $\theta R_e$ and $\Delta \hat{R}_e$, $\hat{\Phi}$ can be made identical to $\Phi$ by resampling in $\hat{K}_R$ using the range interpolator. Phase expression of the signal on actual flight path after the range interpolator becomes:

$$\hat{\Phi} = -2\pi \left(\frac{\cos\hat{\psi}}{\cos\psi} \hat{K}_R\right)\left[\left(\frac{\cos\psi}{\cos\hat{\psi}}\Delta \hat{R}_1\right) + \left(\frac{\cos\psi}{\cos\hat{\psi}}\Delta \hat{R}_e\right)\right]$$
$$= -2\pi K_R \left[\Delta R_1 + \left(\frac{\cos\psi}{\cos\hat{\psi}}\Delta \hat{R}_e\right)\right]$$

$$\Delta\Phi = \Phi - \hat{\Phi}$$
$$= -2\pi K_R \left(\Delta R_e - \frac{\cos\psi}{\cos\hat{\psi}}\Delta \hat{R}_e\right)$$
$$\approx -\frac{4\pi}{\lambda}[(a_{001}h_t + a_{200}x_t^2 + a_{020}y_t^2 +$$
$$a_{002}h_t^2 + a_{110}x_t y_t + a_{101}x_t h_t + a_{011}y_t h_t)$$
$$-\frac{\cos\psi}{\cos\hat{\psi}}(\hat{a}_{001}h_t + \hat{a}_{200}x_t^2 + \hat{a}_{020}y_t^2 +$$
$$\hat{a}_{002}h_t^2 + \hat{a}_{110}x_t y_t + \hat{a}_{101}x_t h_t + \hat{a}_{011}y_t h_t)]$$

Figure 3:
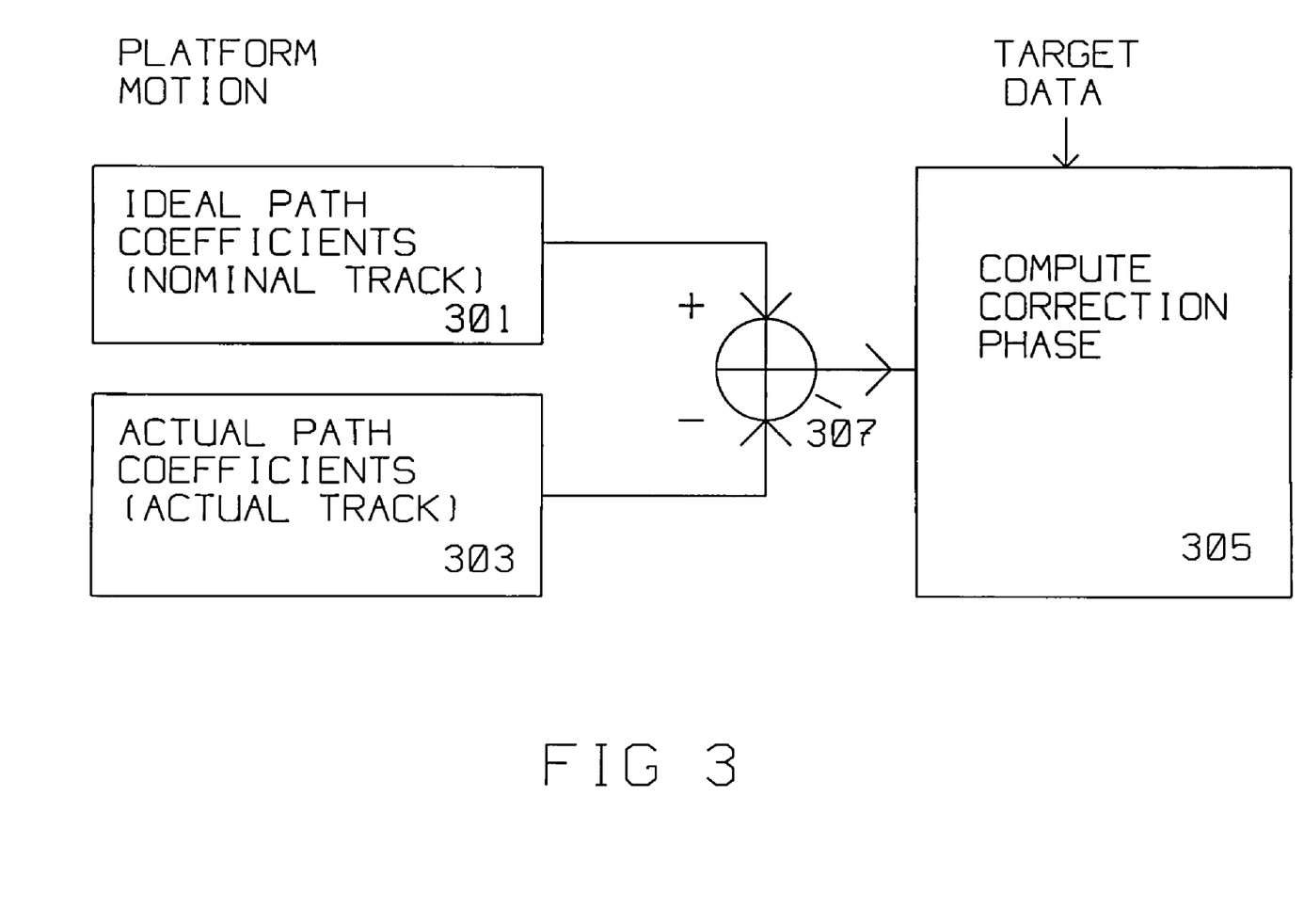
FIG. 3 shows the combination of ideal path information with actual path information and target data to compute phase correction needed for an improved SAR image.

The separation of FPD compensation process by the radar sensor platform and the target deviation from the reference point is detailed in FIG. 3 where the phase correction calculation is performed to obtain:

$$\Delta\Phi = -\frac{2}{\lambda}\sum_{i,j,k} \Delta a_{ijk}\, x_t^i y_t^j h_t^k$$

In FIG. 3, Ideal Path Coefficients 301, R, $\psi$, $\theta$ are used to compute $a_{ijk}$. Similarly, Actual Path Coefficients 303 for the actual track of the platform $\hat{R}$, $\hat{\psi}$, $\hat{\theta}$ are used to compute $$\overline{a}_{ijk} = \hat{a}_{ijk}\frac{\cos\psi}{\cos\hat{\psi}}$$

Summer 307 combines the outputs from 301 and 303 to generate $$\Delta a_{ijk} = a_{ijk} - \overline{a}_{ijk}$$

for input to Compute Correction Phase 305 where target data $x_t$, $y_t$, $h_t$ is combined with $\Delta a_{ijk}$ to compute $\Delta\Phi$.

2. Signal Processing Method for Compensation of FPD Effect.

Phase error due to FPD is compensated for by using the approximate phase error expression derived above. The coefficients of the truncated Taylor series are determined based on the actual and ideal platform location/motion and the CRP as detailed in FIG. 3, given the horizontal and vertical target displacement from the CRP. There are four steps in performing this calculation as further detailed in FIG. 5:

1) Sectioning the SAR data. Divide the returns forming the expected SAR image into multiple blocks (or Range-Azimuth strips) so that target displacement for each of the multiple blocks (or strips) is compatible with phase error calculations. Area elevation for each image block is obtained from the DTED database (terrain elevation database). Horizontal displacement for each particular block is obtained from the area offset in the processed image.

2) Calculate Taylor series coefficients from the desired (ideal) and actual platform position and CRP according to the method shown above with respect to equation 1. Actual flight path deviation is available at each pulse position while azimuth frequency is given in azimuth angle off mid angle point. Re-mapping between indices in two arrays is also computed.

3) Calculate phase error and compensation in azimuth spacial frequency. This includes forward FFT (Fast Fourier Transform), phase correction, and inverse FFT processing.

4) Merge overlapped portions of two neighboring azimuth strips.

Details for each of above steps are given below.

2.1 Sectioning the SAR Data—Multiple Strips (Range-Azimuth)

In this step, target elevation is obtained from a DTED database based on its latitude/longitude position on Earth of the area, and particular strips (blocks) being illuminated. Target range displacement from the CRP is calculated from the target position in the formed image. With target image expressed in slant plane parameters, each image block (or strip) is projected onto the ground plane to obtain target displacement in range and elevation. The image is divided into blocks. In a best mode implementation, the size of the blocks is compatible with the DTED database resolution, using block size the same as the DTED resolution. The terrain elevation database is stored in increments and the Range-Azimuth strips are chosen to contain an integral number of said increments.

Figure 4:
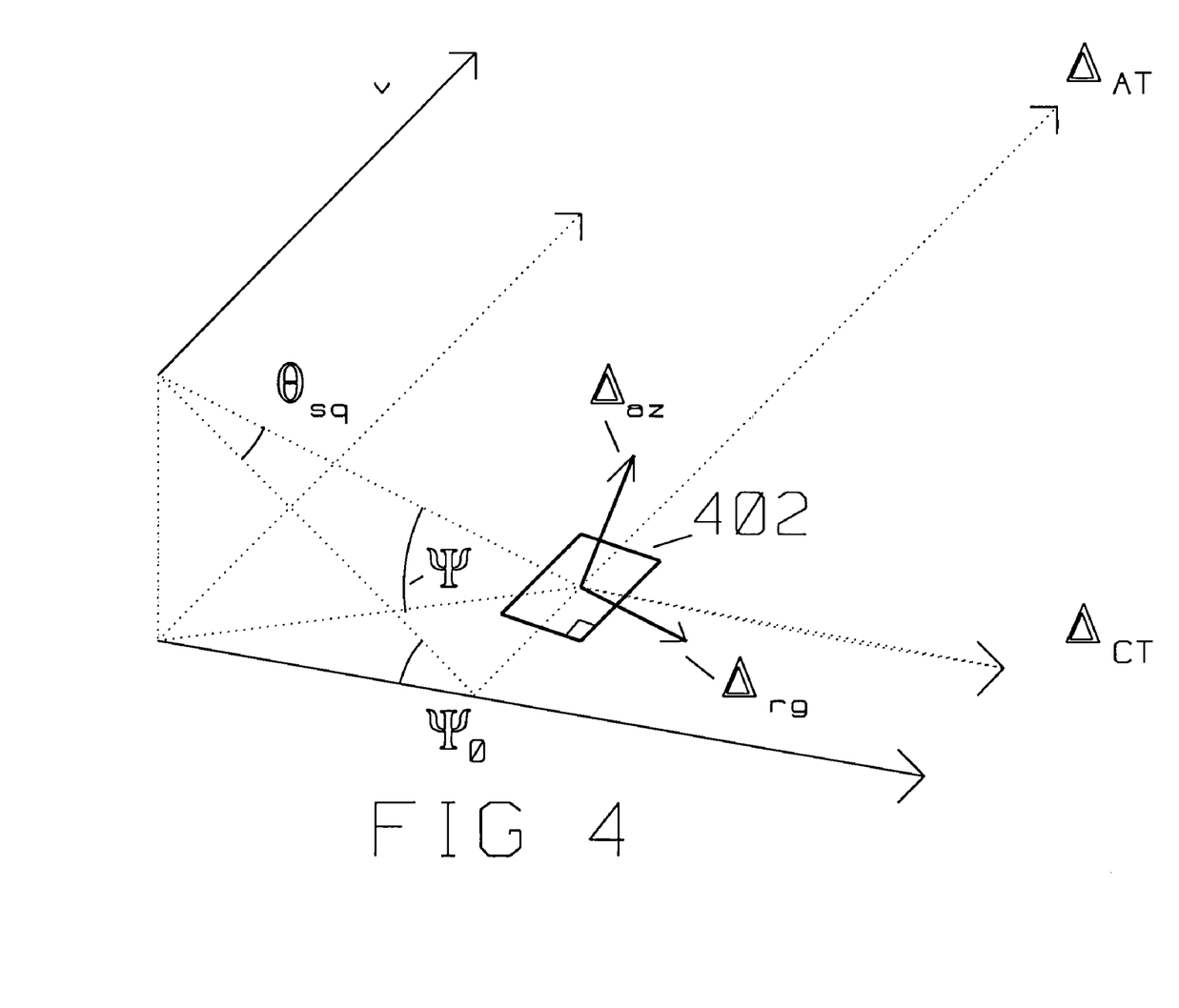
FIG. 4 shows the geometry of the analytical aspect of this disclosure detailing cross track and along track references compared to azimuth and range coordinates at the CRP.

The location of each image block is converted into the AT-CT (Along Track-Cross Track) coordinates using a coordinate transform. The map center (CRP) is used as a the reference point of the coordinate systems and denotes range and azimuth displacement and squint angle in the slant plane with $\Delta_{rg}$, $\Delta_{az}$ and $\theta_{sq}$ respectively, as shown in FIG. 4.

Denote the grazing angle from the current aircraft position (in broadside) with $\Psi$ and $\Psi_0$ respectively, the CT and AT displacement of the strip (image block) 402 is computed from $$\Delta_{CT} = \frac{(\Delta_{rg}\cos\theta_{sq} - \Delta_{az}\sin\theta_{sq})}{\cos\psi_0}$$

$$\Delta_{AT} = \Delta_{rg}\sin\theta_{sq} + \Delta_{az}\cos\theta_{sq}$$

If elevation information is available on grids parallel to the AT-CT orientation, area elevation for block 402 can be obtained for a given $\Delta_{CT}$ and $\Delta_{AT}$. If elevation information derived from DTED is available in different orientation, e.g. north-east, displacement in rotated coordinate system on ground plane can be calculated through coordinate transformation of $\Delta_{CT}$ and $\Delta_{AT}$.

2.2 Determination of Pulse Index for the Calculation of Taylor Series Coefficients The degrees of phase that needs to be corrected in accordance with this teaching is expressed in equation 1 above, and the coefficients of the Taylor series expansion are calculated from the ideal path 202 and actual (flight) path 204. Platform position is available for each pulse. Convert FPD information in azimuth frequencies. Furthermore, compute the pulse number corresponding to the desired azimuth frequency samples. As discussed below, range compressed azimuth frequency data is obtained by performing an FFT for each image strip with 50 percent overlap. For the FFT length and the azimuth pixel spacing, $N_{fft}$ and $d_{pxl}$, sampling interval in azimuth frequency and the azimuth angle off mid angle point is given by:

$$\Delta K_{AZ} = \frac{1}{N_{FFT} d_{pxl}}$$

$$\Delta_{\varphi k} = \frac{2}{\lambda}\left(k - \frac{N_{FFT}-1}{2}\right)\Delta K_{AZ} \text{ for } k = 0, 1, \ldots, N_{FFT}-1$$

Denoting $\phi_{mid}$ the Doppler cone angle at mid angle point, Doppler cone angle and azimuth displacement from the mid angle point for azimuth frequency sample index k are:

$\phi_k = \phi_{mid} + \Delta\phi_k$ $\Delta X_k = R(\cos \phi_k - \cos \phi_{mid})$ Denoting the distance for PRI and the distance of the mid-angle point in the collection array from the first pulse with $d_{PRI}$ and $X_{mid}$, respectively, the pulse index corresponding to the azimuth frequency index k is obtained by:

$$n_k = \left[\frac{\Delta X_k + x_{mid}}{d_{pri}}\right]$$

where the bracket is used to indicate the round-off operation.

2.3 Signal Processing for Phase Correction.

Phase correction is performed in azimuth frequency for each compressed data in range. Elevation information for each target area is provided for a group of image pixels thus each image block is processed separately for phase correction. To maintain continuity between neighboring image blocks target elevation is interpolated for all range bins and the whole image is divided into overlapped azimuth strips for the phase correction in the azimuth frequency domain.

Interpolation of target elevation range for an azimuth image strip is performed using data fitting methods such as cubic spline or least squares polynomial approximation from the acquired target elevation for image blocks as described above. Then, using the Taylor series coefficients that are computed from the actual and ideal flight track and the pulse index search described in section 2.2 phase error is calculated for each range bin in each azimuth strip.

Figure 5:
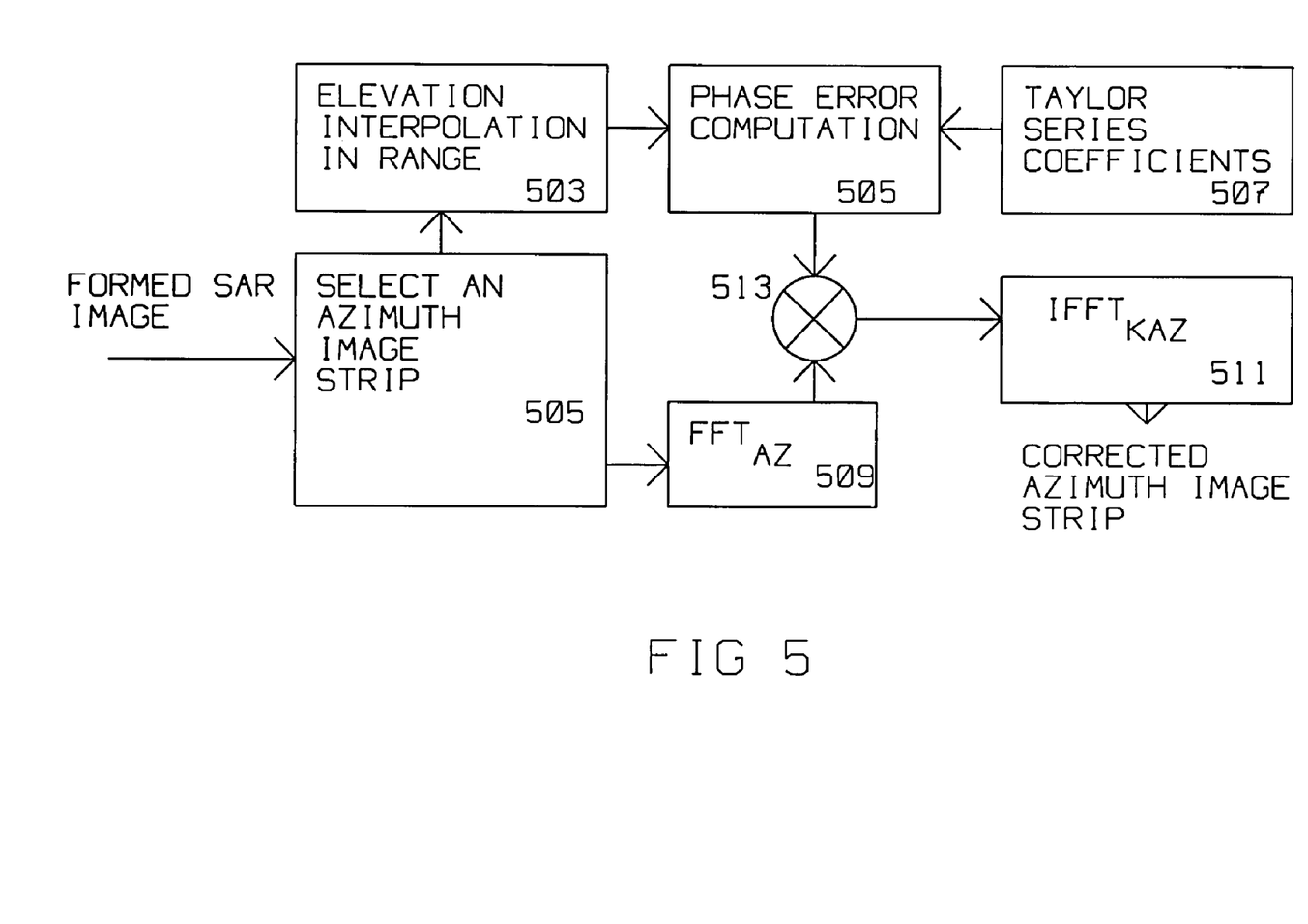
FIG. 5 shows the signal processing steps of this teaching to arrive at a corrected SAR image.

As shown in FIG. 5, divide the SAR image in convenient azimuth strips using Select Azimuth Image Strip 505 on a portion of the uncorrected, formed SAR image. Perform an $FFT_{AZ}$ 509 on the selected azimuth strip. Concurrently compute Elevation Interpolation in Range 503 on the same azimuth strip to generate $x_t$, $y_t$, $h_t$ of the target. Combine R, Ψ, Θ with $\hat{R}$, $\hat{\psi}$, $\hat{\Theta}$ in Taylor series Coefficients 507 to generate $\Delta a_{ij}$ for the particular chosen strip.

Perform Phase Error Computation 505 to generate $\Delta\Phi(K_{AZ})$ from $\Delta a_{ij}$ and $x_t$, $y_t$, $h_t$. $\Delta\phi(K_{AZ})$ is applied to the azimuth frequency data in (logical) summer 513 to obtain phase corrected data. The phase corrected data from summer 513 is converted back to the spatial azimuth domain using $IFFT_{KAZ}$ 511. Data is arranged around the sample with zero index by circular data shifting after performing the FFT and IFFT functions.

2.4 Merging Azimuth Strips Through Weighted Sum.

Figure 6:
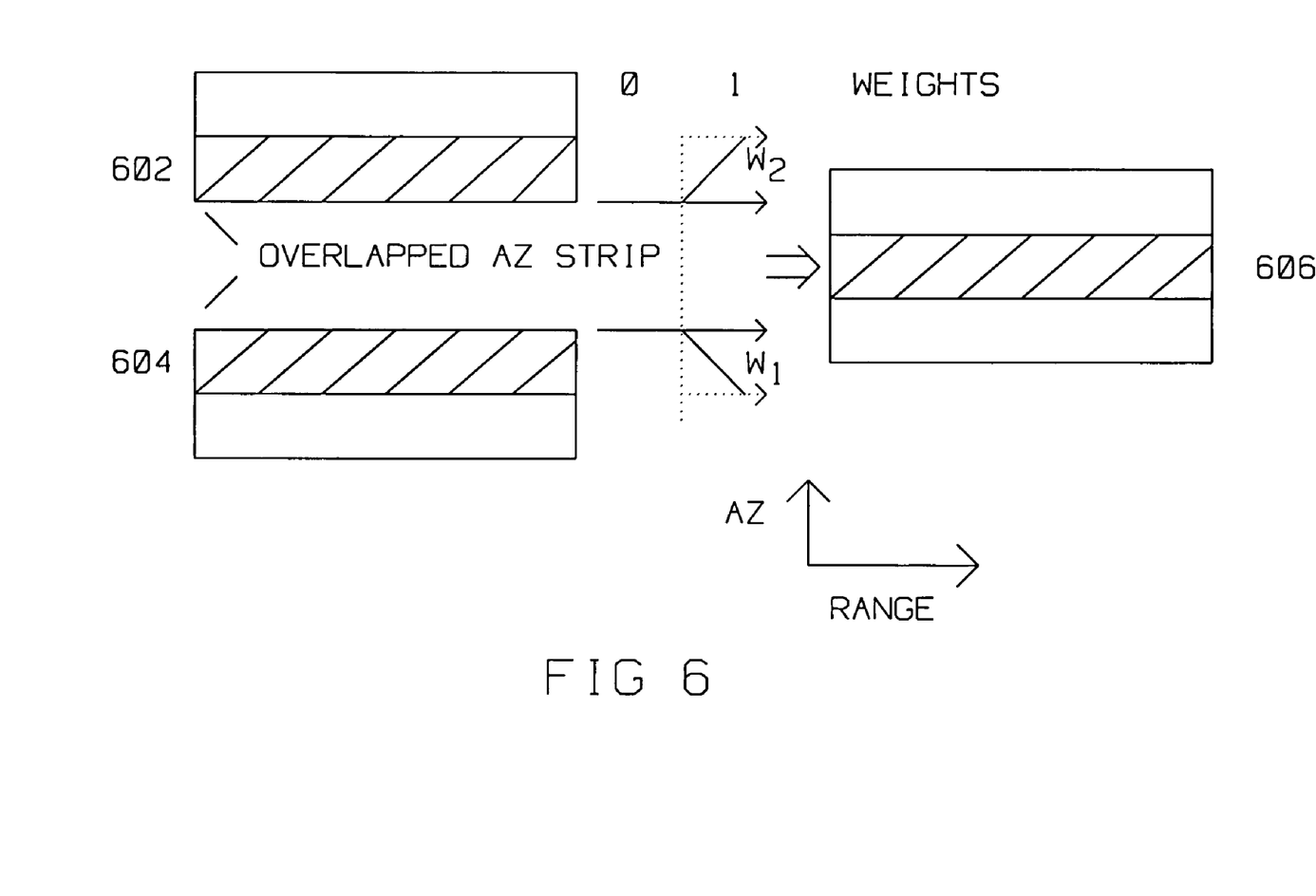
FIG. 6 shows the overlapping of azimuth strips to yield a corrected strip or SAR image.

For smooth transition between neighboring image strips after phase correction, corrected azimuth pixel data $D_i$ in neighboring strips in each range bin are merged using linearly weighted sum in the overlapped region, as shown in FIG. 6. Here, strip 602 overlaps strip 604. When the overlap regions are combined, the result is strip 606 of width of strip 602 plus 604 minus the overlap region. Note that strips are adjacent along the azimuth dimension.

3.0 Best Mode Results

Figure 7:
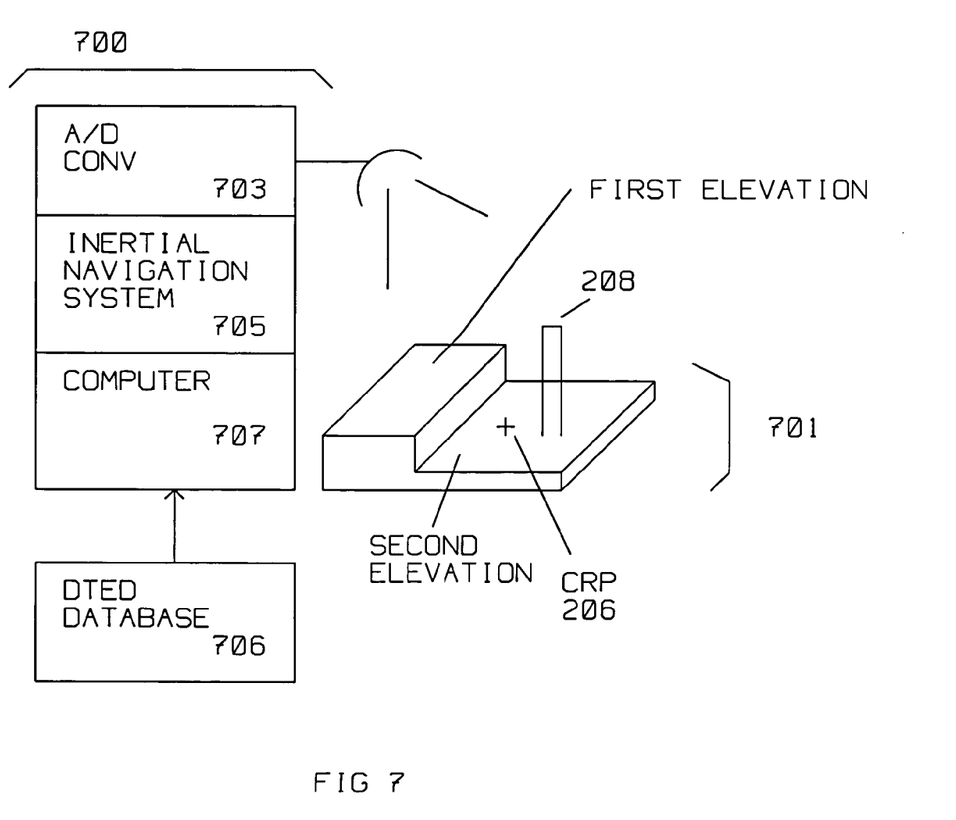
FIG. 7 shows the typical hardware used to us the present teaching.

As shown in FIG. 7, FIG. 2, and as explained above, an example of the teachings herein are best applied in a simplified scenario. Radar 700 acquires a SAR image of radar scatterers in an area 701 around a central reference point CRP 206. Target 208 is within area 701 covered by radar 700. The area 701, and target 208 illuminated by radar 700, covers terrain having a first elevation and a second elevation. The radar 700 is on a moving platform, where the moving platform is moving along an actual path 204. The actual path is displaced from an ideal path 202, that is, for best SAR imagery the path is meant to be rectilinear in a plane. However, the actual path 204 may diverge from a straight line rising or dipping below a reference plane. These conditions are compensated for in the SAR image by radar 700 comprising:

an analog to digital converter 703 for converting radar returns from area 701 to digital returns;

a navigation system 705 for motion compensating the digital returns with respect to central reference point 206 and actual path 204;

a computer 707 for:

a) Dividing the digital returns descriptive of the formed SAR image into multiple blocks, such as a first strip and an adjacent strip. The first strip covers a first part of the area, at a first elevation. The adjacent strip covers a second part of the area. The second area has a second elevation. The first strip is overlapping the adjacent strip over an overlap portion.

b) Extracting the first elevation from a terrain elevation database 706.

c) Extracting the second elevation from the terrain elevation database 706.

d) Computing a first horizontal displacement of returns (range deviation) for the first strip using the first elevation.

e) Computing a second horizontal displacement of returns (range deviation) for the adjacent strip using the second elevation f) Computing Taylor series coefficients for the first horizontal displacement and the second horizontal displacement using the ideal path 202, the actual path 204 and central reference point 206 for the first strip and the adjacent strip. Actual flight path deviation is available at each pulse position while azimuth frequency is given in azimuth angle off mid angle point. Remapping between indices in two arrays is also computed.

g) Computing phase error compensation and compensation in azimuth (spacial frequency) using the Taylor series coefficients, a Fast Fourier Transform and an inverse Fast Fourier Transform for the first strip to obtain first strip corrected data and for the adjacent strip to obtain second strip corrected data.

h) Applying the phase error compensation to the digital returns to obtain the SAR image.

The SAR image is further improved by having the first strip corrected data and the second strip corrected data merged over the overlap portion to generate a relatively seamless SAR image.

Phase Error Comparison

Expression for the residual phase error due to FPD after the range interpolator is expressed as $$\Phi_{exact} = -\frac{4\pi}{\lambda}[(R_t - R) - (\hat{R}_t - \hat{R})]$$

Phase error to be applied, computed in accordance with Taylor series calculated in section 2, $$\Phi_{approx} \approx$$
$$-\frac{4\pi}{\lambda}[(a_{001}h_1 + a_{200}x_t^2 + a_{020}y_t^2 + a_{002}h_t^2 + a_{110}x_ty_t + a_{101}x_th_t + a_{011}y_th_t)$$

$$-\frac{\cos\psi}{\cos\hat{\psi}}(\hat{a}_{001}h_1 + \hat{a}_{200}x_t^2 + \hat{a}_{020}y_t^2 + \hat{a}_{002}h_t^2 + \hat{a}_{110}x_ty_t + \hat{a}_{101}x_th_t + \hat{a}_{011}y_th_t)$$

In light of this, the phase error due to the approximation is $$\epsilon_\Phi = \Delta\Phi_{approx} - \Delta\Phi_{exact}$$

For the calculation of phase error, actual flight path is simulated to deviate, for example, as much as 30 meters from the ideal path in the vertical plane. In this example, residual phase error after range interpolator, without using the teachings herein, is relatively large. However, the phase error induced by the 30 meter deviation from the ideal path is compensated for by the present teaching, thus producing a clearer SAR image.

All references cited in this document are incorporated herein in their entirety by reference. Specifically, *Synthetic Aperture Radar* by John J Kovaly, ISBN 0-89006-056-8, Artech House, and *Radar Technology* by Eli Brookner, ISBN 0 89006 0215, Artech House, are incorporated herein in their entirety by reference to provide a background for this teaching and definition of variables used herein.

Although presented in exemplary fashion employing specific embodiments, the disclosed structures are not intended to be so limited. For example, the strips extending in azimuth may only cover partial range of the area 701, depending on terrain contour. Also, the height of the focus can be chosen depending on target height. Should a target of interest be relatively high above the terrain, the computation can be tailored to a particular elevation thus refining focus at that elevation for a clearer image.

Those skilled in the art will also appreciate that numerous changes and modifications could be made to the embodiment described herein without departing in any way from the concepts contained in these teachings.

The invention claimed is:

1. A radar for acquiring a SAR image of radar scatterers in an area around a central reference point, said area having a first elevation and a second elevation, said radar on a moving platform, said moving platform moving along an actual path, said actual path displaced from an ideal path, said radar comprising:
   an analog to digital converter for converting radar returns from said area to digital returns;
   a navigation system for motion compensating said digital returns with respect to said central reference point and said actual path;
   a computer for:
   dividing said digital returns descriptive of said SAR image into a first strip and an adjacent strip, said first strip covering a first part of said area, said first part having said first elevation, said adjacent strip covering second part of said area said second area having said second elevation, said first strip overlapping said adjacent strip over an overlap portion;
   extracting said first elevation from a terrain elevation database;
   extracting said second elevation from said terrain elevation database;
   computing a first horizontal displacement for said first strip using said first elevation;
   computing a second horizontal displacement for said adjacent strip using said second elevation;
   computing Taylor series coefficients using said ideal path, said actual path and said central reference point for said first strip and said adjacent strip;
   computing phase error compensation using said Taylor series coefficients, a Fast Fourier Transform and an inverse Fast Fourier Transform for said first strip to obtain first strip corrected data and for said adjacent strip to obtain second strip corrected data;
   applying said phase error compensation to said digital returns to obtain said SAR image.

2. A radar as described in claim 1, wherein said first strip corrected data and said second strip corrected data are merged over said overlap portion to generate said SAR image.

3. A radar as described in claim 2 wherein said Taylor series is truncated after a second order term.

4. A radar as described in claim 3 wherein said terrain elevation database is stored in increments and said first strip and said second strip contain an integral number of said increments.

5. A radar as described in claim 3 wherein said terrain elevation database is interpolated for target elevation using cubic spline approximation.

6. A radar as described in claim 3 wherein said terrain elevation database is interpolated for target elevation using a least squares polynomial approximation.

7. A method for acquiring a SAR image of radar scatterers using a radar in an area around a central reference point, said area having a first elevation and a second elevation, said radar on a moving platform, said moving platform moving along an actual path, said actual path displaced from an ideal path, said method comprising the steps of:
   converting radar returns from said area to digital returns;
   motion compensating said digital returns with respect to said central reference point and said actual path;
   dividing said digital returns descriptive of said SAR image into a first strip and an adjacent strip, said first strip covering a first part of said area, said first part having said first elevation, said adjacent strip covering second part of said area said second area having said second elevation, said first strip overlapping said adjacent strip over an overlap portion;

extracting said first elevation from a terrain elevation database;

extracting said second elevation from said terrain elevation database;

computing a first horizontal displacement for said first strip using said first elevation;

computing a second horizontal displacement for said adjacent strip using said second elevation;

computing Taylor series coefficients using said ideal path, said actual path and said central reference point for said first strip and said adjacent strip;

computing phase error compensation using said Taylor series coefficients, a Fast Fourier Transform and an inverse Fast Fourier Transform for said first strip to obtain first strip corrected data and for said adjacent strip to obtain second strip corrected data;

applying said phase error compensation to said digital returns to obtain said SAR image.

8. A method as described in claim 7, wherein said first strip corrected data and said second strip corrected data are merged over said overlap portion to generate said SAR image.

9. A method as described in claim 8 wherein said Taylor series is truncated after a second order term.

10. A method as described in claim 9 wherein said terrain elevation database is stored in increments and said first strip and said second strip contain an integral number of said increments.

11. A method as described in claim 10 wherein said terrain elevation database is interpolated for target elevation using cubic spline approximation.

12. A method as described in claim 10 wherein said terrain elevation database is interpolated for target elevation using a least squares polynomial approximation.

* * * * *